US006964325B2

(12) United States Patent
Maes

(10) Patent No.: US 6,964,325 B2
(45) Date of Patent: Nov. 15, 2005

(54) INTEGRATED TAGGING SYSTEM FOR AN ELECTRONIC SHOCK ABSORBER

(75) Inventor: Mario Maes, Zutendaal (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/662,546

(22) Filed: Sep. 15, 2003

(65) Prior Publication Data

US 2005/0056502 A1     Mar. 17, 2005

(51) Int. Cl.[7] ................................................ F16F 9/34
(52) U.S. Cl. ............................... 188/299.1; 188/266.2; 280/5.503
(58) Field of Search ........................... 188/266.1, 266.2, 188/299.1, 282.4, 282.5, 322.19, 322.2; 280/5.503

(56) References Cited

U.S. PATENT DOCUMENTS

| | | | |
|---|---|---|---|
| 4,909,536 A * | 3/1990 | Hale ........................ 280/6.157 |
| 5,125,681 A | 6/1992 | Brackette, Jr. |
| 5,350,187 A | 9/1994 | Shinozaki |
| 5,396,973 A * | 3/1995 | Schwemmer et al. ..... 188/267.1 |
| 5,510,988 A * | 4/1996 | Majeed et al. ................. 701/37 |
| 5,570,288 A * | 10/1996 | Badenoch et al. ............ 701/37 |
| 5,570,289 A * | 10/1996 | Stacey et al. ................. 701/37 |
| 5,606,503 A * | 2/1997 | Shal et al. ....................... 701/1 |
| 5,653,315 A | 8/1997 | Ekquist et al. |
| 5,971,116 A * | 10/1999 | Franklin .................... 188/282.4 |
| 6,049,746 A * | 4/2000 | Southward et al. ............ 701/37 |
| 6,073,736 A * | 6/2000 | Franklin ................. 188/322.15 |
| 6,244,398 B1 * | 6/2001 | Girvin et al. ................ 188/316 |
| 6,456,912 B1 * | 9/2002 | Raynauld et al. ............. 701/37 |
| 6,464,048 B1 | 10/2002 | Groves et al. |
| 6,505,108 B2 * | 1/2003 | Bodie et al. ................... 701/41 |
| 6,591,178 B2 * | 7/2003 | Krueger et al. ................ 701/83 |
| 2002/0104724 A1 | 8/2002 | Reybrouck et al. |

* cited by examiner

*Primary Examiner*—Robert A. Siconolfi
(74) *Attorney, Agent, or Firm*—Harness, Dickey & Pierce, PLC

(57) ABSTRACT

An integrated tagging system for an electronically controlled shock absorber having a shock absorber with damping characteristics unique to the shock absorber. An electronic control module is in electronic communication with the shock absorber for controlling the shock absorber. A memory device is integrally formed with the shock absorber and is in electronic communication with the electronic control module. The memory device stores calibration data containing the damping characteristics of the shock absorber and stores a unique identification number. The electronic control module accesses the memory device and reads the calibration data and the unique identification number in order to control the shock absorber.

18 Claims, 3 Drawing Sheets

INTEGRATED TAGGING SYSTEM FOR AN ELECTRONIC SHOCK ABSORBER

FIELD OF THE INVENTION

The present invention relates to electronic shock absorbers and more particularly to an integrated tagging system for electronic shock absorbers.

BACKGROUND OF THE INVENTION

Shock absorbers are used in connection with automotive suspension systems to absorb unwanted vibrations which occur during driving. To absorb unwanted vibrations, shock absorbers are generally connected between the body and the suspension of the motor vehicle. A piston is located within the shock absorber and is connected to the body of the motor vehicle through a piston rod. Because the piston is able to limit the flow of damping fluid within the working chamber of the shock absorber when the shock absorber is compressed or extended, the shock absorber is able to produce a damping force which counteracts the vibration which would otherwise be transmitted from the suspension to the body. The greater the degree to which the flow of damping fluid within the working chamber is restricted by the piston, the greater the damping forces which are generated by the shock absorber.

In selecting the amount of damping that a shock absorber is to provide, three vehicle performance characteristics are often considered: ride comfort, vehicle handling, and road holding ability. Ride comfort is often a function of the spring constant of the main springs of the vehicle, as well as the spring constant of the seat, tires, and the shock absorber. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristic of the shock absorber is described in commonly assigned U.S. Pat. No. 6,464,048, incorporated by reference in its entirety as if fully disclosed herein. This reference discloses an electronically controlled shock absorber having a control switch located within the passenger compartment of the motor vehicle for adjusting the damping characteristics of the shock absorbers. A control means translates the output from the control switch to an electronic signal which is then sent to the shock absorber.

However, each individual shock absorber has its own specific damping characteristics inherent with the tolerances of its machined and assembled parts. For example, the same electronic signal from an electronic controller ordering a specific amount of damping to a set of shock absorbers can result in varying degrees of damping from one shock absorber to the next. This varying degree of damping is due primarily to differences inherent in the manufacturing and assembly process of each individual shock absorber. While not preventing the shock absorber from performing its intended purpose, these varying degrees of damping result in some inefficiencies. While the varying degrees of damping can be reduced by reducing the tolerances of the machined parts, this solution increases the fabrication cost of the shock absorber.

Accordingly, it is an object of the present invention to provide the art with a shock absorber that informs an electronic controller about that shock absorber's specific and unique damping characteristics without unduly increasing the costs of shock absorber manufacturing.

SUMMARY OF THE INVENTION

An integrated tagging system for an electronically controlled shock absorber is provided. The integrated tagging system includes a shock absorber with damping characteristics unique to the shock absorber. An electronic control module is in electronic communication with the shock absorber for controlling the shock absorber. A memory device is integrally formed with the shock absorber and is in electronic communication with the electronic control module. The memory device stores calibration data containing the damping characteristics of the shock absorber and stores a unique identification number. The electronic control module accesses the memory device and reads the calibration data and the unique identification number in order to control the shock absorber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
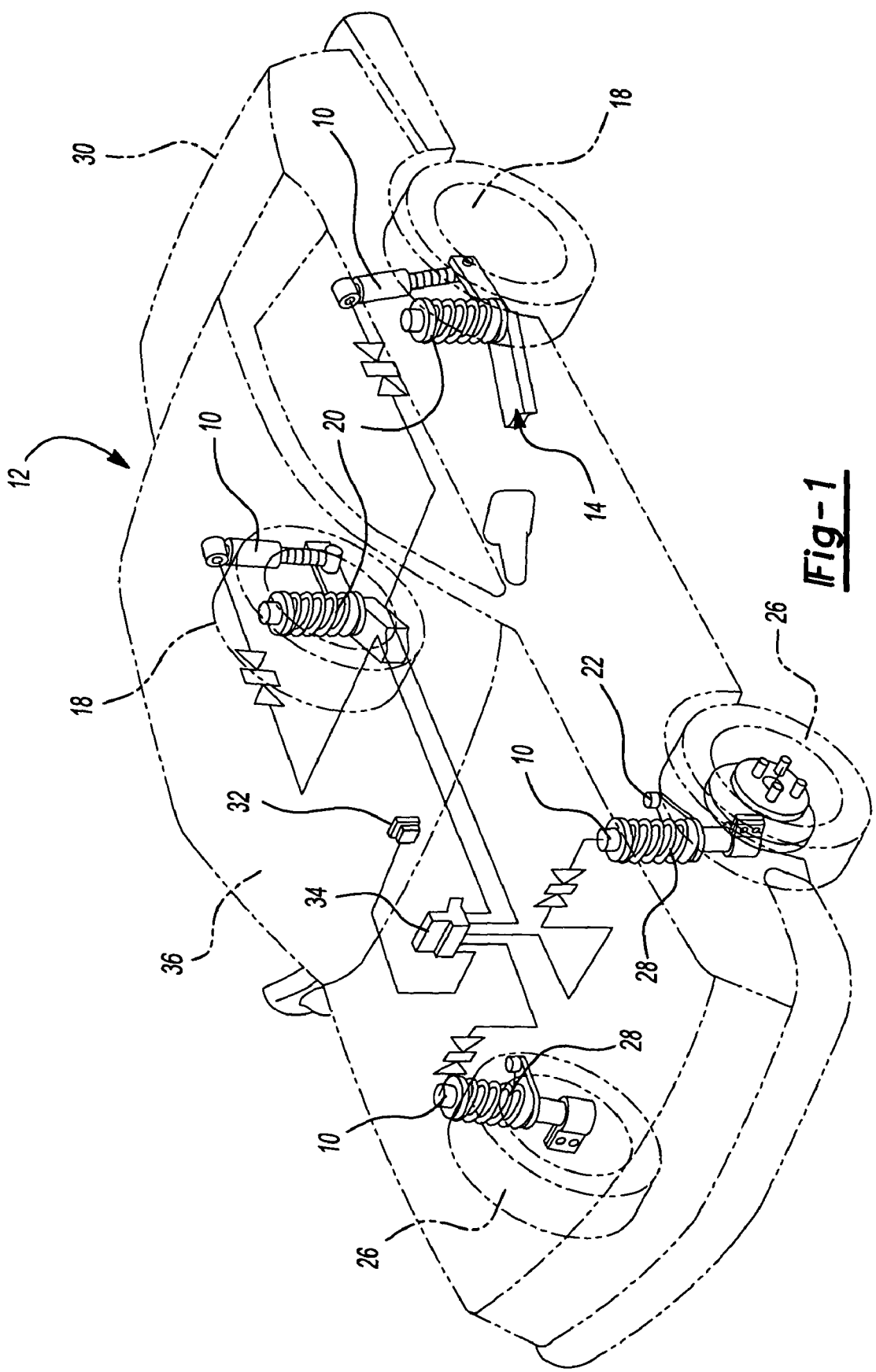
FIG. 1 is a perspective view of a motor vehicle incorporating a shock absorber and unique tagging system constructed according to the principles of the present invention.

Referring now to the drawings in which like reference numerals designate like or corresponding parts throughout the several views, there is shown in FIG. 1 a plurality of four electronic shock absorbers designated generally by the reference numeral 10, each incorporating a unique tagging system in accordance with the present invention. The description and operation of shock absorbers 10 will be described first, followed by a detailed description of the tagging system of the present invention.

Electronic shock absorbers 10 are depicted in operative association with a diagrammatic representation of a conventional motor vehicle 12. Motor vehicle 12 includes a rear suspension system 14 having a transversely extending rear axle assembly (not shown) adapted to operatively support a pair of rear wheels 18. The rear axle assembly is operatively connected to the motor vehicle 12 by means of a pair of electronically controlled shock absorbers 10 as well as by helical coil springs 20. Similarly, motor vehicle 12 has a front suspension system 22 including a transversely extending front axle assembly (not shown) to operatively support a pair of front wheels 26. The front axle assembly is operatively connected to motor vehicle 12 by means of a second pair of electronically controlled shock absorbers 10 and by helical coil springs 28. Electronic shock absorbers 10 serve to damp the relative movement of the unsprung portion (i.e., the front and rear suspension systems 22 and 14, respectively) and the sprung portion (i.e., body 30) of motor vehicle 12.

While motor vehicle 12 has been depicted as a passenger car, electronic shock absorbers 10 may be used with other types of automotive vehicles or in other types of applications. Further, the term "electronic shock absorber" as used herein will refer to dampers in general and will include MacPherson struts, spring seat units, and any other electronically controlled shock absorber design known in the art.

The damping characteristics of electronic shock absorbers 10 are controlled by a mode select switch 32 and an electronic control module 34. Mode select switch 32 is located within a passenger compartment 36 of motor vehicle 12 and is accessible by the occupants of motor vehicle 12. Mode select switch 32 is in electronic communication with electronic control module 34 and is used for selecting which type of damping characteristics electronic shock absorbers 10 are to provide (i.e., firm, soft or automatic). Electronic control module 34 is in electronic communication with each electronic shock absorber 10 and receives the output from mode select switch 32. Electronic control module 34 then generates and sends electronic control signals to each electronic shock absorber 10 in order to control the damping characteristics of electronic shock absorbers 10. By controlling the damping characteristics of electronic shock absorbers 10, electronic shock absorbers 10 are able to dampen the relative movement between body 30 and the suspension of the motor vehicle 12 in such a manner as to optimize both ride comfort and road handling ability simultaneously.

Figure 2:
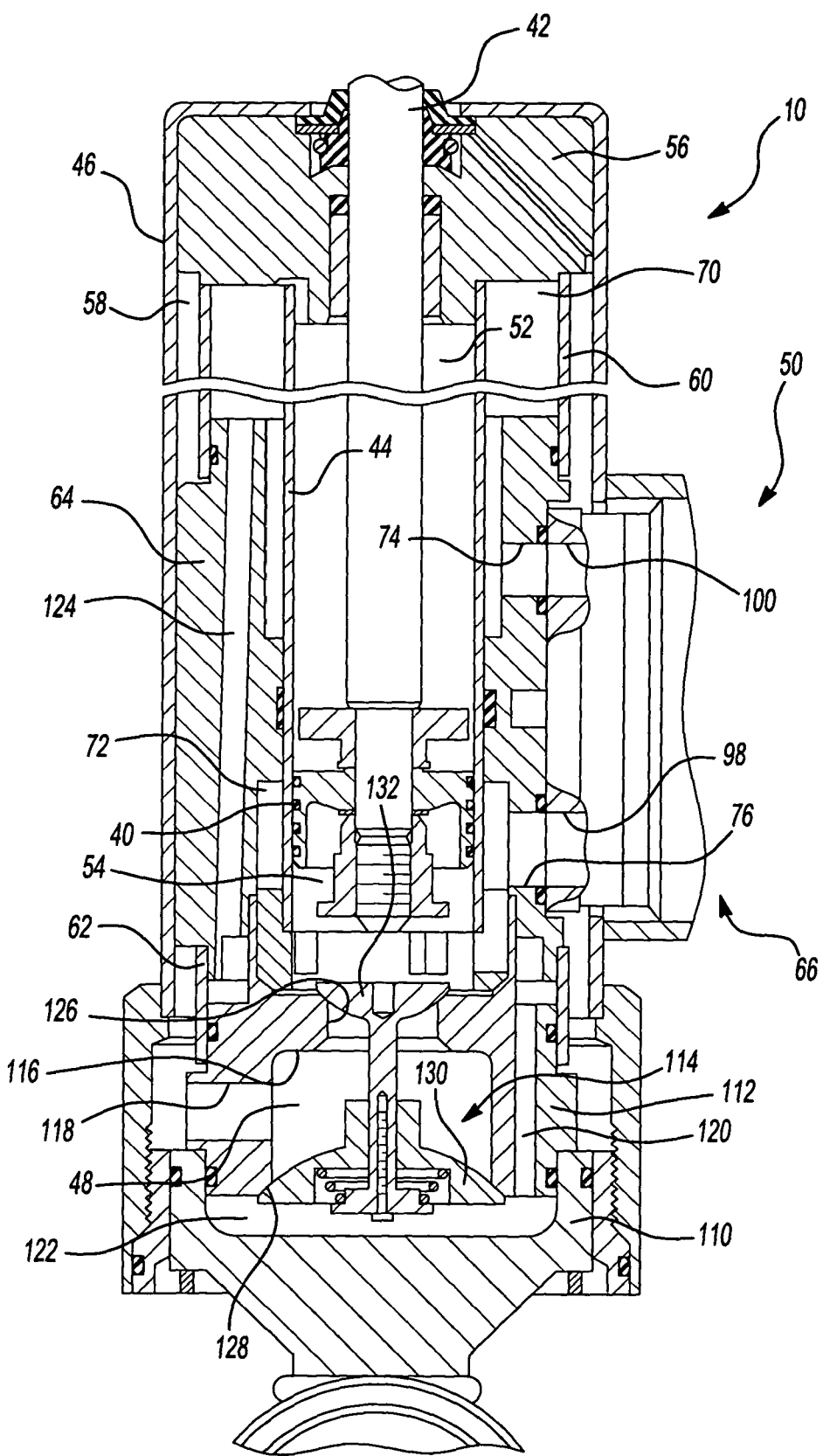
FIG. 2 is a side sectional view of the shock absorber of the present invention.

Turning now to FIG. 2, one of electronic shock absorbers 10 is illustrated in greater detail. It is to be understood that each electronic shock absorber 10 is substantially similar and therefore the following description applies to all four illustrated electronic shock absorbers 10. Electronic shock absorber 10 is a dual tube shock absorber which comprises a piston 40, a piston rod 42, a pressure tube 44, a reserve tube 46, a base valve assembly 48 and a continuously variable servo valve assembly 50. Piston 40 is slidingly received within pressure tube 44 and divides pressure tube 44 into an upper working chamber 52 and a lower working chamber 54.

Piston rod 42 is attached to piston 40 and extends out of pressure tube 44 and reserve tube 46 through a rod guide 56. The outer end of piston rod 42 is adapted to be attached to the sprung mass of the motor vehicle 12 (i.e. body 30) by means known well in the art. Reserve tube 46 surrounds pressure tube 44 and with pressure tube 44 defines a reserve chamber 58. Reserve tube 46 is adapted for attachment to the unsprung mass of the motor vehicle 12 by methods known well in the art. Base valve assembly 48 is disposed between lower working chamber 54 and reserve chamber 58. Base valve assembly 48 controls the flow of fluid into and out of reserve chamber 58 as described below.

Continuously variable servo valve assembly 50 comprises an upper intermediate tube 60, a lower intermediate tube 62, a valve interface 64 and a solenoid valve assembly 66. Upper intermediate tube 60 is disposed within the upper portion of reserve chamber 58 and sealingly engages rod guide 56. Lower intermediate tube 62 is disposed within the lower portion of reserve chamber 58 and sealingly engages base valve assembly 48. Valve interface 64 is disposed within reserve chamber 58 and sealingly engages upper intermediate tube 60, lower intermediate tube 62 and pressure tube 44. Pressure tube 44, rod guide 56, upper intermediate tube 60 and valve interface 64 define an upper intermediate chamber 70 disposed between reserve chamber 58 and working chambers 52 and 54. Pressure tube 44, base valve assembly 48, lower intermediate tube 62 and valve interface 64 define a lower intermediate chamber 72 disposed between reserve chamber 58 and working chambers 52 and 54. Valve interface 64 defines a rebound outlet 74 in communication with upper intermediate chamber 70 and a compression outlet 76 in communication with lower intermediate chamber 72.

Figure 3:
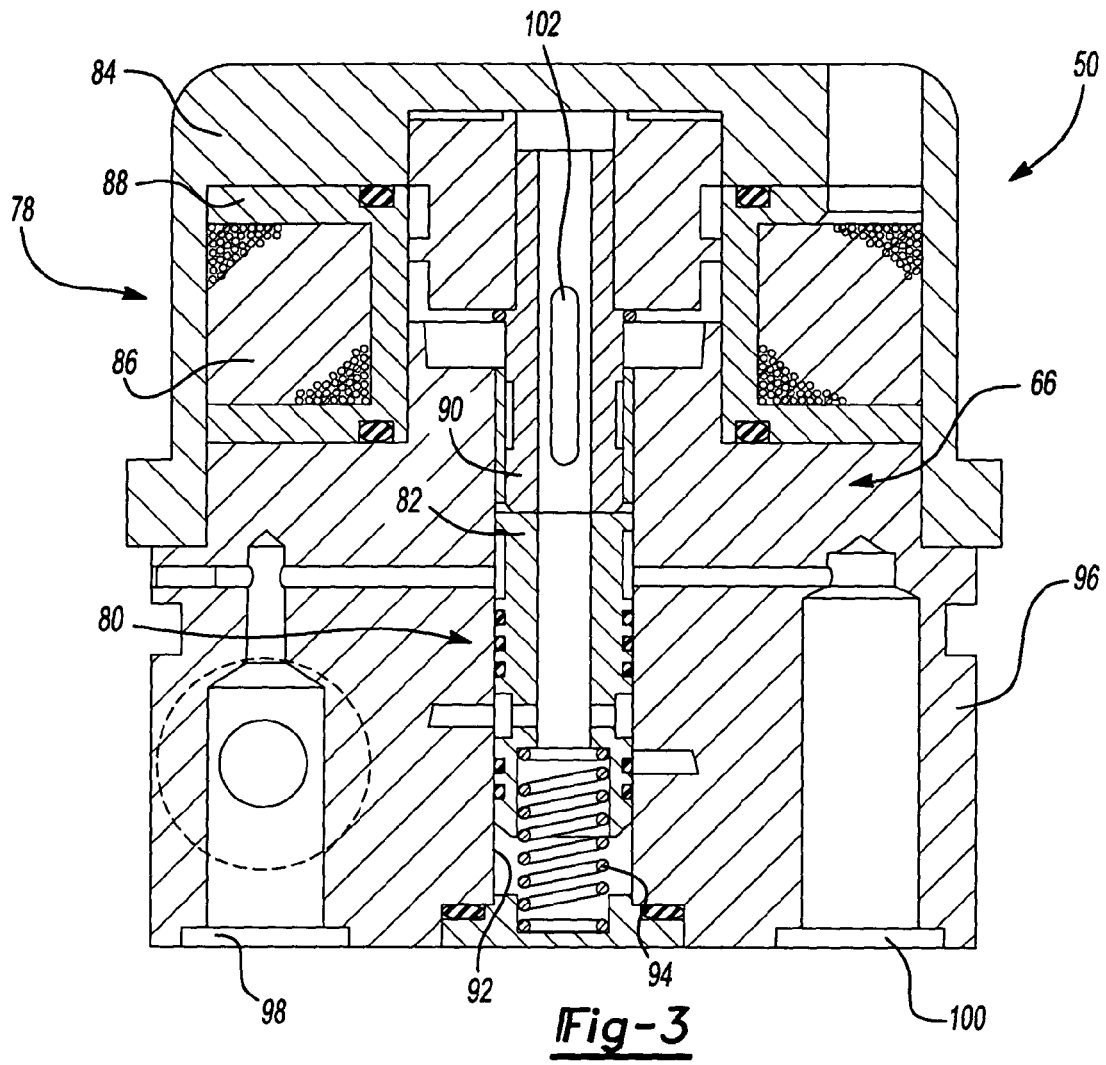
FIG. 3 is a side sectional view of the continuously variable servo valve assembly used with the shock absorber of FIG. 2.

Referring now to FIG. 3 and with continued reference to FIG. 2, solenoid valve assembly 66 sealingly engages valve interface 64 and is sealingly secured to reserve tube 46. Solenoid valve assembly 66 comprises a solenoid coil assembly 78, a solenoid valve body assembly 80 and a spool valve 82. Solenoid coil assembly 78 includes a housing 84 within which is contained a set of windings 86 and a coil bobbin 88. A valve member 90 is disposed within the set of windings 86 and moves axially within the windings 86 in response to electrical power being supplied to windings 86 as is well known in the art. Solenoid coil assembly 78 is attached to solenoid valve body assembly 80. Spool valve 82 is disposed within a bore 92 extending through solenoid valve body assembly 80. A spring 94 biases spool valve 82 towards solenoid coil assembly 78. Thus, solenoid coil assembly 78 operates to move spool valve 82 axially within bore 92 of solenoid valve body assembly 80. As illustrated, spool valve 82 is in an upper position. However, spool valve 82 is movable to a lower position (not shown) when full power is being supplied to solenoid coil assembly 78. Moreover, by using pulse width modulation, the position of spool valve 82 can be intermediate the lower and upper positions.

Solenoid valve body assembly 80 comprises a valve body 96, a compression inlet 98, and a rebound inlet 100. Solenoid valve assembly 60 is positioned such that valve body 96 sealingly engages valve interface 64 with compression inlet 98 sealingly engaging compression outlet 76 and with rebound inlet 100 sealingly engaging rebound outlet 74. A fluid passageway 102 extends between and fluidly connects bore 92 and reserve chamber 58.

Turning again to FIG. 2, base valve assembly 48 of electronic shock absorber 10 comprises a lower mounting adapter 110, a cylinder end 112 and a dual check valve assembly 114. Lower mounting adapter 110 is secured to reserve tube 46 and is adapted to be connected to the unsprung mass of the vehicle 12. Cylinder end 112 is secured to lower mounting adapter 110 at one end and lower intermediate tube 62 and valve interface 64 at its opposite end. Cylinder end 112 defines a central passage 116 which is in communication with reserve chamber 58 through a passage 118. Cylinder end 112 also defines a passage 120 extending between upper intermediate chamber 70 and a chamber 122 located between lower mounting adapter 110 and cylinder end 112 through a bore 124 extending through valve interface 64. Finally, cylinder end 112 defines a passage 126 extending between chamber 116 and lower working chamber 54 and a passage 128 extending between chamber 116 and chamber 122.

Dual check valve assembly 114 includes a first one-way check valve 130 and a second one-way check valve 132. Check valve 130 allows fluid flow through passage 128 from chamber 116 to chamber 122 but not through passage 128 from chamber 122 to chamber 116. Check valve 132 allows fluid flow through passage 126 between chamber 116 and lower working chamber 54 but not through passage 126 from lower working chamber 54 to chamber 116.

During the operation of electronic shock absorber 10, there is no damping force characteristic in either rebound or compression that is determined by piston 40. The damping force characteristics for electronic shock absorber 10 are controllable by continuously variable servo valve assembly 50 such that in any given complete stroke of electronic shock absorber 10 (e.g. rebound to compression to rebound), the damping forces depend on the amount of current given to energize solenoid coil assembly 78 by the electronic control module 34 (FIG. 1). When little or no current is given to energize solenoid coil assembly 78, continuously variable servo valve assembly 50 generates a firm rebound damping force with a soft compression damping force for electronic shock absorber 10. When full current to solenoid coil assembly 78 is supplied, continuously variable servo valve assembly 50 generates a soft rebound damping force with a firm compression damping force for electronic shock absorber 10. In this way, the damping force characteristics of electronic shock absorber 10 are controlled electronically by the electronic control module 34 (FIG. 1).

Figure 4A:
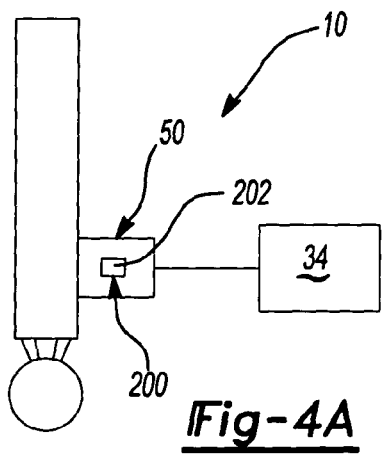
FIG. 4A is a schematic diagram of the shock absorber of FIG. 2 illustrating the tagging system of the present invention.

Turning now to FIG. 4A, electronic shock absorber 10 is shown schematically illustrated with electronic control module 34 and includes an integrated tagging system 200. Integrated tagging system 200 includes a memory device 202 imbedded within electronic shock absorber 10 and in electronic communication with electronic control module 34. Memory device 202 is non-volatile (e.g. the stored data is permanent) and cannot be separated from electronic shock absorber 10. Memory device 202 is preferably an electronic device containing non-volatile memory capable of storing digital data.

As illustrated, memory device 202 is formed as part of electronic shock absorber 10 within continuously variable servo valve assembly 50. Alternatively, memory device 202 may be integrally formed within reserve tube 46 (FIG. 2) of electronic shock absorber 10, or any other part thereof.

Figure 4B:
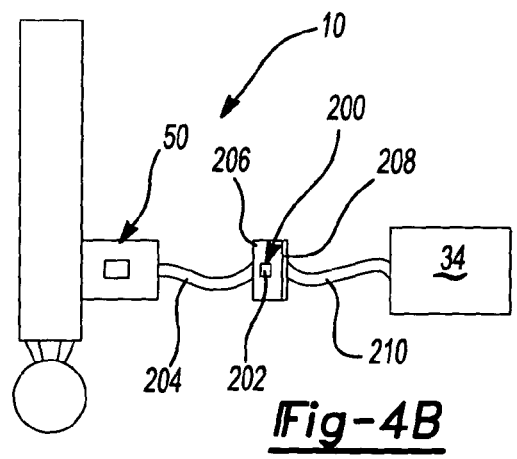
FIG. 4B is a schematic diagram of the shock absorber of FIG. 2 illustrating an alternate embodiment of the tagging system of the present invention.

Referring briefly to FIG. 4B, an alternate arrangement of tagging system 200 is illustrated. A transmission line 204 terminating in a connector 206 is coupled to continuously variable servo valve assembly 50. Transmission line 204 cannot be separated from continuously variable servo valve assembly 50. Connector 206 interfaces with a connector 208 and a transmission line 210 which is coupled to electronic control module 34. In this arrangement, memory device 202 is integrally formed within connector 206. Alternatively, memory device 202 may be integrally formed with transmission line 204. Memory device 202 may interface with and use any type of serial connection, including but not limited to a T1 line having digital service level 1, an I2C bus, and a serial peripheral interface.

After fabrication of electronic shock absorber 10 during a manufacturing process, electronic shock absorber 10 is tested to determine its individual performance under load conditions. The deviation of the performance of electronic shock absorber 10 from the mean of similarly manufactured shock absorbers is then determined. This deviation (e.g. calibration data) is then stored in memory device 202. An identification number is assigned to electronic shock absorber 10 and likewise stored within memory device 202. In this way, electronic shock absorber 10 carries its own unique identification number and unique calibration data.

After mounting electronic shock absorber 10 within motor vehicle 12, electronic control module 34 accesses memory device 202 and reads the calibration data and identification number assigned to electronic shock absorber 10. Electronic control module 34 then uses continuously variable servo valve assembly 50 to adjust the damping characteristics of electronic shock absorber 10 based on the calibration data, thereby improving the damping performance of motor vehicle 12. The identification number may be used to keep track of electronic shock absorber 10 and may be referenced by a manufacturer, mechanic, or customer through electronic control module 34.

By integrally forming memory device 202 within electronic shock absorber 10, integrated tagging system 200 does not require additional external components and cannot be inadvertently separated from electronic shock absorber 10. Moreover, integrated tagging system 200 uses the existing transmission lines and electronic communication between electronic shock absorber 10 and electronic control module 34. By individually tailoring the damping characteristics of electronic shock absorber 10, motor vehicle 12 will benefit from increased performance and efficiency.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An integrated tagging system for an electronically controlled shock absorber comprising:
    a shock absorber having damping characteristics;
    an electronic control module separate from and in electronic communication with said shock absorber for controlling said shock absorber; and
    a memory device integrally formed and attached to said shock absorber said memory device being separate from and in electronic communication with said electronic control module, said memory device storing calibration data containing said damping characteristics of said shock absorber;
    wherein said electronic control module accesses said memory device and reads said calibration data in order to control said shock absorber.

2. The tagging system of claim 1, wherein said memory device includes a unique identification number for said shock absorber, and unique identification number accessible by said electronic control module.

3. The tagging system of claim 1, wherein said damping characteristics include a tested performance of said shock absorber.

4. The tagging system of claim 1, wherein said damping characteristics include a deviation from an expected performance of similarly constructed shock absorbers.

5. The tagging system of claim 1, wherein said memory device is an electronic device containing non-volatile memory.

6. A shock absorber system for use in a motor vehicle comprising:
- a shock absorber adapted to be mounted to the motor vehicle;
- an electronic controller adapted to be mounted within the motor vehicle separate from said shock absorber for controlling said shock absorber;
- a transmission line coupled between said shock absorber and said electronic controller for communicating electronic signals between said electric controller and said shock absorber; and
- a memory device in communication with said electronic controller, said memory device being integrally connected to said shock absorber and separate from said electronic controller such that said memory device cannot be separated from said shock absorber, said memory device storing calibration data for said shock absorber.

7. The shock absorber of claim 6, wherein said transmission line includes a connector and said memory device is integrally formed with said connector.

8. The shock absorber of claim 6, wherein said memory device is disposed within said transmission line.

9. The shock absorber of claim 6, wherein said transmission line is selected from one of a group consisting of a T1 line, a I2C bus, and a serial peripheral interface.

10. The shock absorber of claim 6, wherein said memory device is electronically coupled to said transmission line.

11. The shock absorber system of claim 6, wherein said shock absorber includes a pressure cylinder forming a working chamber having first and second portions operable to store damping fluid, a first valve member disposed within said pressure cylinder having a first plurality of flow passages, a second valve member disposed within said pressure cylinder having a second plurality of flow passages, said second valve member being displaceable with respect to said first valve member to vary the flow of damping fluid between said first and second portions of said working chamber, and an electronically controlled servo to displace said second valve member with respect to said first valve member.

12. The shock absorber system of claim 11, wherein said memory device is integrally formed within said electronically controlled servo.

13. The shock absorber of claim 6, wherein said memory device includes a unique identification number for said shock absorber, said unique identification number accessible by said electronic control module.

14. The tagging system of claim 6, wherein said damping characteristics include a tested performance of said shock absorber.

15. The tagging system of claim 6, wherein said damping characteristics include a deviation from an expected performance of similarly constructed shock absorbers.

16. A method for tagging an electronically controlled shock absorber for use in a motor vehicle, the method comprising:
- providing an electronic shock absorber;
- providing an electronic controller separate from and in communication with said electronic shock absorber;
- providing a memory device integrally mounted and attached to said shock absorber and separate from said electronic controller;
- testing said shock absorber before installation into the motor vehicle to determine calibration data for said shock absorber;
- storing said calibration data in said memory device; and
- accessing said calibration data using said electronic controller to calibrate said shock absorber.

17. The method of claim 16, further comprising assigning a unique identification number to said shock absorber and storing said unique identification number in said memory device.

18. The method of claim 17, further comprising accessing said unique identification number using said electronic controller to identify said shock absorber.

* * * * *